Aug. 1, 1961   M. W. RICHTER ET AL   2,994,511
APPARATUS FOR STRETCHING A FLEXIBLE HELICAL ARTICLE
Filed May 12, 1959   3 Sheets-Sheet 1

INVENTORS
M. W. RICHTER
D. G. STETKA
BY
H. J. Winegar
ATTORNEY

Aug. 1, 1961   M. W. RICHTER ET AL   2,994,511
APPARATUS FOR STRETCHING A FLEXIBLE HELICAL ARTICLE
Filed May 12, 1959   3 Sheets-Sheet 2

INVENTORS
M. W. RICHTER
D. G. STETKA
BY
H. J. Winegar
ATTORNEY

Aug. 1, 1961  M. W. RICHTER ET AL  2,994,511
APPARATUS FOR STRETCHING A FLEXIBLE HELICAL ARTICLE
Filed May 12, 1959  3 Sheets-Sheet 3

INVENTORS
M. W. RICHTER
D. G. STETKA
BY
H. J. Winegar
ATTORNEY

United States Patent Office 2,994,511
Patented Aug. 1, 1961

2,994,511
APPARATUS FOR STRETCHING A FLEXIBLE HELICAL ARTICLE
Melvin W. Richter, Perry Hall, Md., and Daniel G. Stetka, Madison, N.J., assignors to Western Electric Company, Incorporated, New York, N.Y., a corporation of New York
Filed May 12, 1959, Ser. No. 812,721
10 Claims. (Cl. 254—51)

The present invention relates generally to apparatus for stretching a flexible helical article, and more particularly to apparatus for separating adjacent convolutions of a spring cord by deforming the cord into an undulate configuration.

Accordingly, the general object of the invention is to provide apparatus for stretching a flexible helical article.

Another object of the invention is to provide apparatus for separating adjacent convolutions of a spring cord by deforming the cord into an undulate configuration.

According to a preferred process of manufacturing spring cords for telephone handsets, a desired straight length of jacketed multiconductor cordage is wound in a helix along the length of a rotating and longitudinally moving mandrel, preferably as disclosed in a related copending application of E. C. Hardesty and D. L. Myers, Serial No. 681,035, filed on August 29, 1957 now Patent No. 2,920,351 which issued January 12, 1960. As disclosed in that application, the cordage is first cut to length, and is then tipped and banded before winding on the mandrel. After the winding operation, the trailing end of the cord is clamped to the mandrel, and then the mandrel with the helical coil clamped thereto is placed in an oven and heat treated to impart desired properties, particularly retractility and freedom from objectionable strain in the jacketing material.

In a preferred type of cord, the jacketing material comprises a multiply plasticized polyvinyl-chloride composition having elastic properties, as disclosed in a related copending application of V. T. Wallder, Serial No. 529,641, filed on August 22, 1955. According to that application, a suitable elastic composition comprises 50–70 parts by weight of polyvinyl chloride which may contain up to about 10% of copolymerized vinyl acetate, 15–25 parts by weight of a monomeric plasticizer such as di-2-ethyl hexyl phthalate, 15–25 parts by weight of a polymeric plasticizer such as a dibasic acid-glycol polyester, and minor proportions of suitable stabilizers, lubricants and pigments. After the winding of such a cord on a mandrel, the cord is heated on the mandrel to a temperature above the softening point of the polyvinylchloride composition to relieve strains in the jacketing material, and is then cooled.

After cooling to room temperature, the heat-treated cord is removed from the mandrel and the pitch of the helix is reversed in order to provide a cord having greater retractility, as disclosed in a related copending application of E. L. Franke, Jr., Serial No. 681,034, filed on August 29, 1957, now Patent No. 2,920,348 which issued January 12, 1960. As disclosed in that application, an endless conveyor is provided having a succession of opposing, aligned pairs of rotatable clamps mounted thereon for advancement therewith. At a loading station, a succession of cords is inserted between the advancing pairs of clamps, each cord being secured at each end by one clamp. The conveyor advances the clamps in synchronism so that the cords proceed in a direction transverse to their lengths to various operating stations of the machine. At one station along the conveyor, the opposing clamps of each pair are rotated in opposite directions with respect to each other so as to reverse the pitch of the helix and so as to impart a predetermined overtwist to the reversed cord. At a later station, a small amount of relative rotation of the clamps in the opposite direction to that of the reversing operation is caused in order to remove the overtwist.

In the manufacture of the mentioned type of spring cords with the process outlined above, and in various cases where heat treating of a coiled plastic-jacketed cord is utilized, it has been found that there is a tendency for adjacent convolutions of the cord to adhere tenaciously to each other as a result of the heat-treating operation.

Accordingly, a specific object of the present invention is to provide a conveyorized apparatus designed to separate adjacent convolutions of a succession of spring cords previous to a helix-reversing operation.

The foregoing and other objects are accomplished, according to certain features of the invention, by providing a plurality of wheels mounted in spaced relationship to each other so that a helical article may pass transversely of its length between the wheels with the peripheries of the wheels facing the article and with at least one wheel being on each side of the article. In addition, means are provided for advancing the helical article transversely of its length between the wheels, the wheels being designed for deforming the helical article into an undulate configuration so as to apply a stretching force thereto at various points along the length thereof.

Preferably, the article is a spring cord, clamps are provided for opposite ends of the cord, a conveyor is provided for advancing an endless succession of the clamps, and the clamps are moved relatively apart to stretch the cord as it passes between the wheels. In addition a plurality of rollers may be mounted in abutting relationship to each other around the circumference of each wheel, the rollers being freely rotatable about circumferential axes to permit longitudinal shifting of the cord. The rollers are preferably substantially spherical, but may also be cylindrical.

Preferably, the wheels are mounted in two overlapping groups disposed alternately along spaced, parallel axes for free rotation and the periphery of at least one wheel on one axis projects into a space defined between two wheels on the other axis. The sides of all wheels are parallel, with sufficient space therebetween to permit the cord to be pulled between the wheels in surface contact with the peripheries thereof. The wheels may be mounted along two spaced parallel shafts, with means being provided for adjusting the spacing between the shafts to regulate the amount of overlap between the wheels.

Other objects, advantages and features of the invention will appear from the following detailed description of a specific embodiment thereof, when read in conjunction with the appended drawings, in which.

Figure 1:
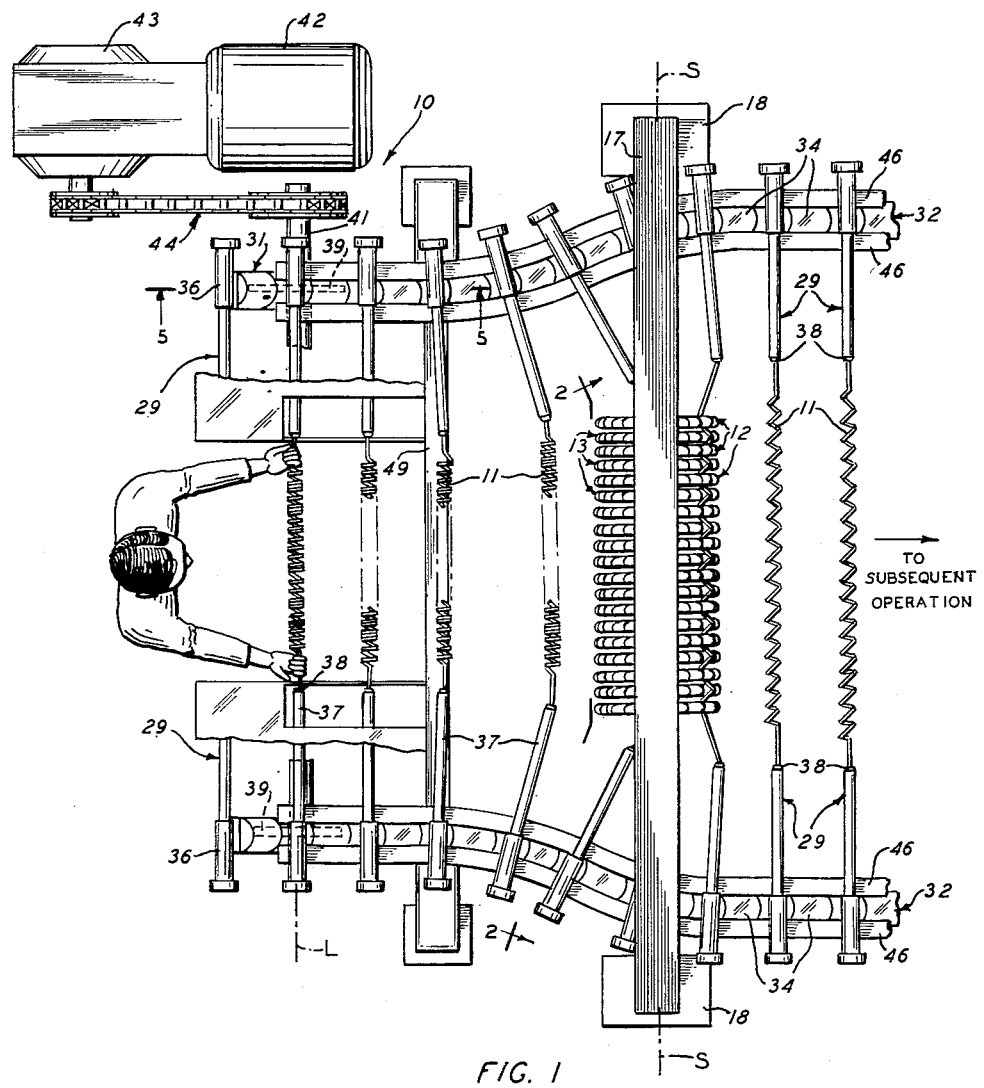
FIG. 1 is a plan view of a portion of a conveyorized spring cord working machine, including a mechanism illustrative of the invention for stretching the cords to separate adjacent convolutions thereof.
Figure 3:
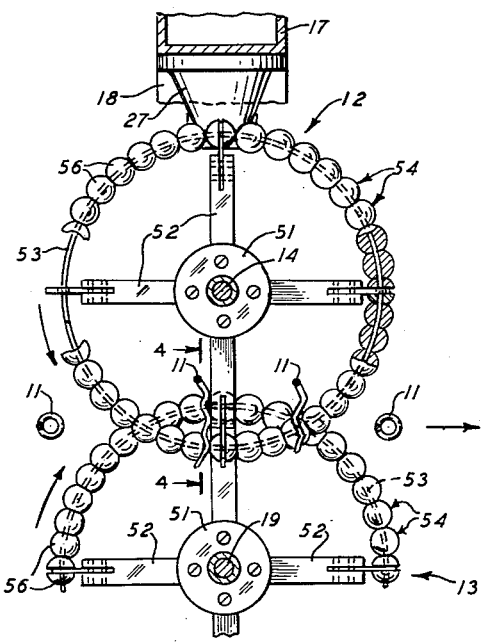
FIG. 3 is an enlarged, fragmentary vertical section, taken generally along the line 3—3 of FIG. 2 in the direction of the arrows and illustrating in side elevation two of the separating wheels according to a first embodiment of the invention wherein spherical rollers are utilized.
Figure 6:
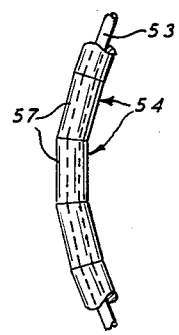
Figure 5:
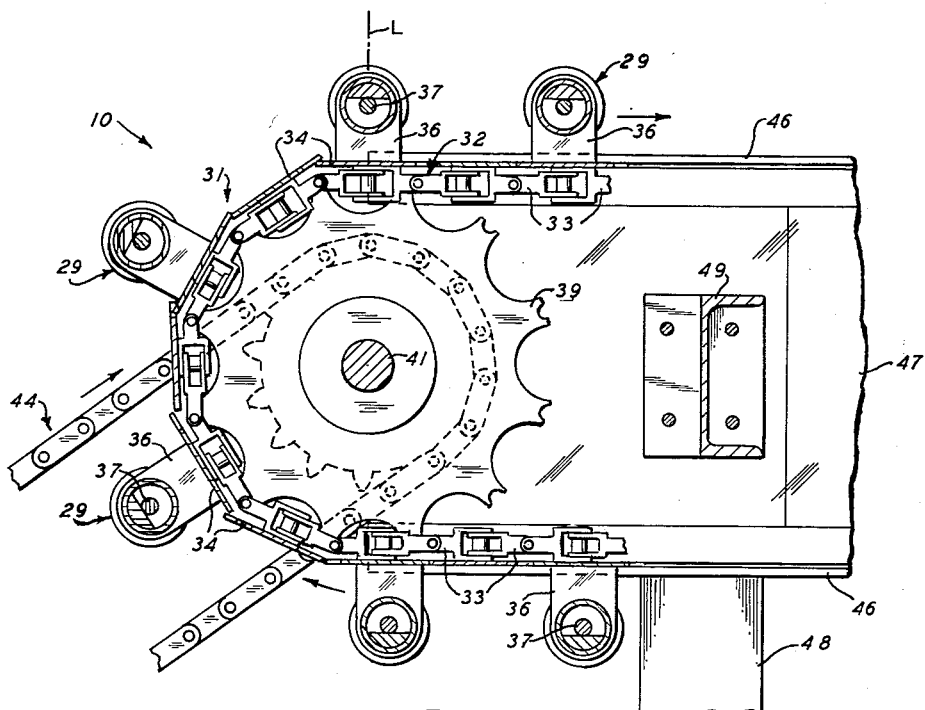

FIG. 5 is an enlarged, vertical section of a portion of the apparatus illustrated in FIG. 1, taken generally along the line 5—5 of FIG. 1 in the direction of the arrows and showing the construction of a preferred form of conveying mechanism, and FIG. 6 is a fragmentary view similar to a portion of FIG. 3, but illustrating a second embodiment of the invention wherein cylindrical rollers are provided.

Referring now in detail to the drawings and in particular to FIG. 1, means designated generally by the numeral 10 are provided for advancing a flexible helical article, and more particularly a succession of spring cords 11—11, between a plurality of spaced wheels designed for stretching the cords to separate adjacent convolutions thereof. As viewed in FIG. 2, the wheels are arranged in two opposing vertically displaced rows, with a plurality of upper wheels being identified generally by the numerals 12—12 and a plurality of lower wheels being designated generally by the numerals 13—13. The advancing means 10 moves a spaced succession of the cords 11—11 transversely of their lengths, from left to right as viewed in FIG. 1, between the wheels 12—12 and 13—13 in surface contact with the opposing peripheries thereof, and the wheels co-operate to deform the advancing cords 11—11 into undulate configurations, as viewed in FIG. 2, so as to apply a stretching force to the cords at various points along the lengths thereof, thus separating adjacent convolutions of the cords from each other.

Figure 2:
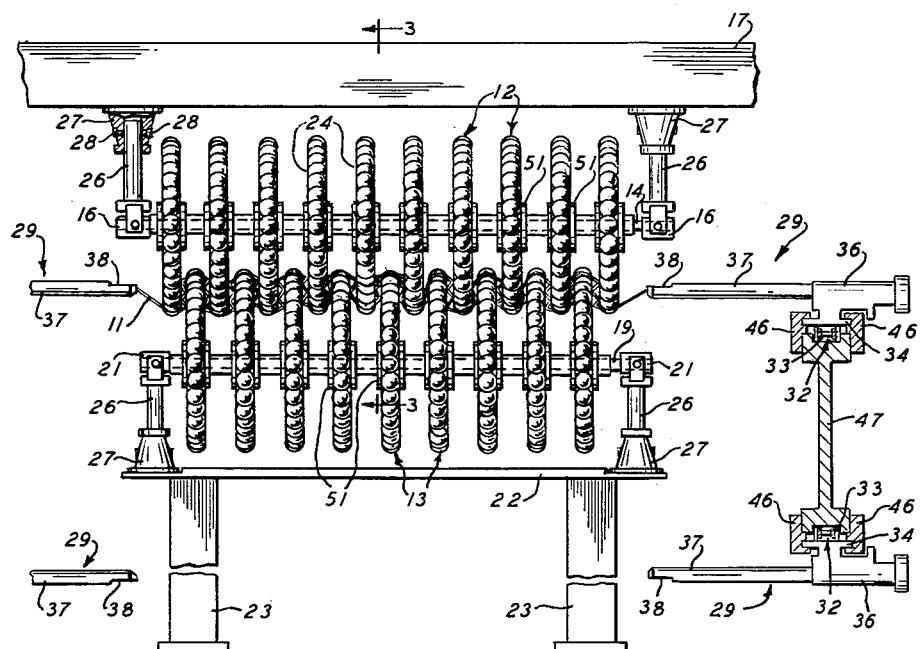
FIG. 2 is an enlarged, fragmentary vertical section of a portion of the stretching apparatus illustrated in FIG. 1, taken generally along the line 2—2 of FIG. 1 in the direction of the arrows and illustrating a preferred arrangement of separating wheels.

As viewed in FIG. 2, the upper wheels 12—12 are secured with their sides parallel at selected spaced intervals along the length of an upper shaft 14 for rotation therewith. The upper shaft 14 is mounted horizontally, for free rotation between a pair of bearing blocks 16—16, which depend from an upper supporting bar 17. The bar 17 is mounted in a fixed position above the upper wheels 12—12 between a pair of vertical standards 18—18 (FIG. 1). In a similar manner, the lower wheels 13—13 are secured with their sides parallel to each other and to those of the upper wheels 12—12 at other selected spaced intervals along the length of a lower shaft 19 for rotation therewith. The lower shaft 19 is mounted for free rotation between a second pair of bearing blocks 21—21, which in turn are mounted on the upper surface of a supporting platform 22. The platform 22 is mounted in a fixed position below the lower wheel 13—13 on standards 23—23.

Preferably, all of the wheels 12—12 and 13—13 are of the same size and the spacing between each adjacent pair of the wheels 12—12 and that between each adjacent pair of the wheels 13—13 is identical. Proceeding from left to right in FIG. 2, the wheels 12—12 and 13—13 are mounted alternately in spaced relationship to each other, along the shafts 14 and 19 and the upper wheels 12—12 are spaced along the shaft 14 at such intervals that spaces 24—24 are defined therebetween. The spaces 24—24 must be at least as wide and are preferably somewhat wider than the width of an associated lower wheel 13 plus twice the diameter of the cord 11.

The lower wheels 13—13 are spaced along the shaft 19 so as to align precisely with the spaces 24—24 between the upper wheels 12—12, thus permitting the peripheries of the lower wheels 13—13 to project into the spaces 24—24. Otherwise stated, the peripheries of the wheels 12—12 and 13—13 overlap each other, as viewed in FIGS. 2 to 4, so that an undulate channel is defined between the wheels, which channel is wide enough to accommodate the spring cords 11—11 therein, as illustrated in FIG. 2.

Figure 4:
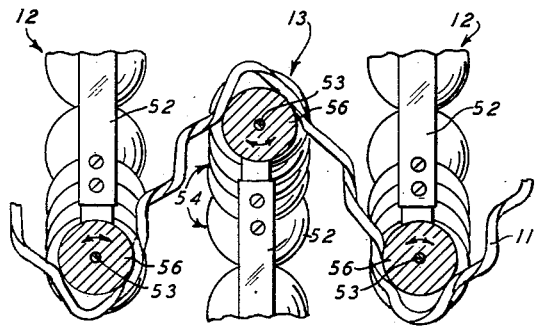
FIG. 4 is an enlarged, fragmentary vertical section, taken generally along the line 4—4 of FIG. 3 in the direction of the arrows and illustrating the operation of the separating wheels.

As each cord 11 in succession is pulled transversely of its length between the overlapping groups of wheels 12—12 and 13—13 by the advancing means 10, the wheels rotate on their shafts 14 and 19 due to engagement with the cord and co-operate with each other to deform the cord into the stretched, undulate configuration illustrated in FIGS. 2 and 4. This deformation is designed to occur over substantially the entire coiled length of the cord 11, so as to accomplish uniform localized extension of the coiled convolutions over the entire length of the cord. This type of uniform extension is designed to apply extensile forces at all places along the length of the cord 11 and is effective to separate each convolution of the cord from every other convolution by pulling the convolutions apart. Thus, any convolutions which stick together as a result of the heat-treating operation described hereinbefore, or which adhere to each other for any other reason, are separated without applying an undue extensile force to the cord as a whole.

As previously mentioned, the horizontal spacing between each upper wheel 12 and each lower wheel 13 adjacent thereto must be at least sufficient to permit the cord 11 to fit therein and to advance therethrough. In practice, it is preferred to space the wheels rather close to the cords, as illustrated; however, the wheels may be spaced much further apart and still accomplish the same object, with the cords being deformed into zig-zag configurations. It is preferred that the spacing be uniform from one end to the other, but for some applications it might be advantageous to pack the wheels closer together toward the center of the cord or toward the ends thereof. The shafts 14 and 19 may be removed from the bearing blocks 16—16 and 21—21, and the spacing between the wheels on each shaft set at any desired values.

The two shafts 14 and 19 are mounted such a distance apart, having regard to the diameters of the wheels 12—12 and 13—13, that the peripheries of adjacent wheels overlap by a desired amount. The amount of overlap governs the total stretching or elongation of the cords 11—11, as the cord 11 is elongated in operation to fill the entire undulate passage between the wheels. The distance between the shafts 14 and 19, and thus the elongation of each cord 11, is determined for each application of the device in accordance with the physical properties of the cords; their length, the coil diameter, the maximum expected adhesion between coils, and the breaking strength thereof.

In order to provide an adaptable apparatus, means are provided for adjusting the distance between the shafts 14 and 19 so as to permit setting of the degree of overlap between the wheels at any required value. In the embodiment of the invention illustrated, such adjusting means include a plurality of movable shafts 26—26 to which the bearing blocks 16—16 and 21—21 are attached. Each of the shafts 26—26 is slidable within an associated housing 27, and is secured therewithin at a desired level by means of set screws 28—28, as indicated in broken section at the upper left of FIG. 2.

As best illustrated in FIG. 1, the advancing means 10 includes a plurality of aligned pairs of clamps designated generally by the numerals 29—29, each pair being designed for clamping the opposite ends of a spring cord 11. An endless succession of the aligned pairs of clamps 29—29, each carrying a cord 11 therebetween, is advanced from left to right as viewed in FIG. 1 by an endless conveyor, designated generally by the numeral 31. At a loading station L at the left end of the conveyor 31, an operator fastens the ends of a cord 11 between the advancing clamps 29—29, after which the conveyor 31 carries the clamps 29—29 to the stretching station S, where the cords pass between and are deformed by the wheels 12—12 and 13—13. The clamps 29—29 grip the ends of the cords tightly in order to prevent the cord ends from pulling out when the cord passes between the wheels 12—12 and 13—13.

As indicated in FIG. 1, the conveyor 31 is arranged so as to move the clamps 29—29 holding a particular cord relatively away from each other to stretch the cord from the ends thereof as the cord passes between the wheels 12—12 and 13—13. Preferably, the conveyor 31 diverges so that both clamps 29—29 in each aligned pair move gradually away from each other during the entire interval of contact between the cord 11 and the wheels 12—12 and 13—13.

The conveyor 31 is further arranged so that the clamps 29—29 of each aligned pair remain separated, with respect to their original positions at the loading station L, after the stretching operation, with the cords 11—11 being extended somewhat to maintain the convolutions separated. This construction facilitates subsequent cord-working operations, such as the helix-reversing operation disclosed in the Franke, Jr. patent. For the purposes of the Franke, Jr. patent, the clamps 29—29 are rotatable to reverse the helix of the cords 11—11; but for the purposes of the present application, the clamps are not rotated. If the separating apparatus disclosed herein were used by itself, then nonrotatable clamps of any suitable type could be provided.

A preferred form of conveyor 31 is illustrated in FIGS. 1, 2 and 5 and is generally similar to the conveyor system disclosed in the Franke, Jr. patent. As viewed in FIG. 1, the conveyor 31 includes two endless chains, designated generally by the numerals 32—32, one at each side of the apparatus. Each of the chains 32—32 includes a plurality of pivotably connected links 33—33, with a plurality of flat plates 34—34 secured to the outer surface of alternate links 33—33, as viewed in FIG. 5. All or some of the plates 34—34 carry a housing 36, within which is journalled a shaft 37 of the clamp 29. In the example illustrated, there is a housing 36 for every second plate 34 in order to provide a desired spacing between the cords 11—11 consistent with the speed of advancement thereof and the operator's ability to insert the cords into the clamps 29—29 at the loading station L. Other arrangements might be utilized in appropriate cases, such as one housing 36 for each plate 34 or one housing 36 for every third plate 34. A clamping jaw 38 is formed at the inner end of each shaft 37, as viewed in FIGS. 1 and 2.

The links 33—33 of each chain 32 pass around an associated sprocket wheel 39 at the left end of the apparatus, as viewed in FIGS. 1 and 5, and about a similar sprocket wheel (not shown) at the right-hand end of the apparatus. The two sprocket wheels 39—39 are keyed to a common drive shaft 41 and are driven from a motor 42, through the intermission of a gear reducer 43 and a sprocket-and-chain transmission designated generally by the numeral 44. With this construction, the opposed pairs of clamps 29—29 are always aligned horizontally with each other to advance a continuous succession of the cords 11—11 in generally horizontal attitudes, transversely of their lengths, between the stretching wheels 12—12 and 13—13.

The distance between each aligned pair of clamps 29—29 at any point along the line of advancement of the cords 11—11 is controlled by providing a pair of guide rails 46—46 for receiving each one of the chains 32—32. The rails 46—46 receive the chains 32—32 therebetween so as to permit sliding horizontal movement of the chains 32—32 under the influence of the motor 42. Since it is desired to diverge the aligned pairs of clamps 29—29 so as to stretch the cords 11—11 during the entire interval that the cords 11—11 contact the wheels 12—12 and 13—13, the rails 46—46 diverge uniformly outward on both sides of the machine at the stretching station S.

In the embodiment illustrated, as best seen at the right of FIG. 2, two identical pairs of rails 46—46 are secured to the top and bottom of a rail support 47 having an I-channel cross section and being curved to fit the desired path of the conveyor chains 32—32 indicated in FIG. 1. The upper rails 46—46 illustrated in FIG. 2 receive and guide the upper or operating runs of the chains 32—32, while the lower rails 46—46 receive and guide the lower or return runs of the chains. One rail support 47 is provided at each side of the machine, and these members provide the main supporting structure for the conveyor 31. The supports 47 are mounted above the floor on suitable standards 48—48, one of which is illustrated in FIG. 5. Also, a number of transverse strength members 49—49, one of which is shown in FIGS. 1 and 5, are secured between the front and rear rail supports 47—47 at spaced intervals along the length of the machine to provide a rigid, integral supporting structure.

Considering now certain preferred constructions for the wheels 12—12 and 13—13, with particular reference to FIG. 3, each of the wheels is formed with a hub 51 secured to the associated shaft 14 or 19 at a desired position therealong and a plurality of spokes 52—52 radiating outward from the hubs 51—51. A toric rim 53 having a circular cross section is secured between the spokes 52—52 of each wheel, and a plurality of rollers designated generally by the numerals 54—54 are mounted in abutting relationship to each other circumferentially around each rim 53 for free rotation about the rim as an axis.

The purpose of the rollers 54—54 is to allow substantially free shifting movement of each cord 11 along its longitudinal axis as the cord is extended by increasing amounts by the wheels 12—12 and 13—13. Thus, each portion of the cord 11 is free to shift longitudinally of itself in any direction that the cord is bent into at any particular time.

According to a first embodiment of the invention illustrated particularly in FIG. 3, the rollers 54—54 comprise oblate spheroidal balls 56—56, which have flattened poles as illustrated and are mounted in generally abutting relationship to each other around the rims 53—53.

According to a second embodiment of the invention illustrated in FIG. 6, the rollers 54—54 constitute short cylindrical members 57—57, having axial bores to permit reception on the rims 53—53 for rotation thereabout.

While certain specific embodiments of the invention have been described hereinabove, it will be obvious that various modifications may be made from the specific details described without departing from the spirit and scope of the invention.

What is claimed is:

1. Apparatus for stretching a flexible helical article, which comprises a plurality of wheels mounted in spaced relationship to each other so that the helical article may pass transversely of its length between said wheels with the peripheries of said wheels facing the article and with at least one wheel being on each side of the article, and means for holding opposite end portions of the article in predetermined spaced relationship and for simultaneously advancing the article transversely of its length between said wheels, said wheels being designed for deforming the helical article into an undulate configuration so as to apply a stretching force thereto at various points along the length thereof.

2. Apparatus for stretching a flexible helical article, which comprises a plurality of wheels mounted for rotation about spaced axes so that their sides are in spaced parallel relationship and their peripheries overlap, and means for holding opposite end portions of the article in predetermined spaced relationship and for simultaneously advancing the helical article transversely of its length between said wheels in surface contact with the peripheries thereof, said wheels co-operating to deform the advancing helical article into an undulate configuration so as to apply a stretching force thereto at various points along the length thereof.

3. Apparatus for stretching a flexible helical article, which comprises at least three rotatable wheels mounted in spaced relationship to each other alternately along spaced parallel axes so that the sides of the wheels are parallel and the periphery of at least one wheel on one axis projects into a space defined between two wheels on the other axis, and means for holding opposite end portions of the article in predetermined spaced relationship and for simultaneously advancing the helical article transversely of its length between said wheels in surface contact with the peripheries thereof, said wheels rotating on their axes as the article passes therebetween and co-operating to deform the advancing helical article into an undulate configuration so as to apply a stretching force thereto at various points along the length thereof.

4. Apparatus for deforming a flexible helical article, which comprises a plurality of wheels mounted for rotation about spaced axes so that their sides are in spaced parallel relationship and their peripheries overlap, means for clamping opposite ends of the helical article, means for moving said clamping means so as to advance the helical article transversely of its length between said wheels in surface contact with the peripheries thereof, said wheels co-operating to deform the advancing helical article into an undulate configuration so as to apply a stretching force thereto at various points along the length thereof, and means for moving said clamping means relatively apart to stretch the helical article from the ends thereof as it passes between said wheels.

5. Apparatus for deforming a flexible helical article, which comprises a plurality of wheels mounted for rotation about spaced axes so that their sides are in spaced parallel relationship and their peripheries overlap, a plurality of rollers mounted in abutting relationship to each other around the circumference of each wheel and freely rotatable about axes substantially tangential to the circumference, means for clamping opposite end portions of the article in predetermined spaced relationship, and means for moving said clamping means so as to advance the helical article transversely of its length between said wheels in surface contact with the peripheries thereof, said wheels being so arranged as to deform the advancing helical article into an undulate configuration so as to apply a stretching force thereto at various points along the length thereof, and said rollers permitting longitudinal shifting of the article.

6. Apparatus for deforming a flexible helical article, which comprises a plurality of wheels mounted for rotation about spaced axes so that their sides are in spaced parallel relationship and their peripheries overlap, a plurality of substantially spherical rollers mounted in abutting relationship to each other around the circumference of each wheel and freely rotatable about axes substantially tangential to the circumference, means for clamping opposite end portions of the article in predetermined spaced relationship, and means for moving said clamping means so as to advance the helical article transversely of its length between said wheels in surface contact with the peripheries thereof, said wheels being so arranged as to deform the advancing helical article into an undulate configuration so as to apply a stretching force thereto at various points along the length thereof, and said spherical rollers permitting longitudinal shifting of the article.

7. Apparatus for deforming a flexible helical article, which comprises a plurality of wheels mounted for rotation about spaced axes so that their sides are in spaced parallel relationship and their peripheries overlap, a plurality of cylindrical rollers mounted in abutting relationship to each other around the circumference of each wheel and freely rotatable about axes substantially tangential to the circumference, means for clamping opposite end portions of the article in predetermined spaced relationship, and means for moving said clamping means so as to advance the helical article transversely of its length between said wheels in surface contact with the peripheries thereof, said wheels being so arranged as to deform the advancing helical article into an undulate configuration so as to apply a stretching force thereto at various points along the length thereof, and said cylindrical rollers permitting longitudinal shifting of the article.

8. Apparatus for separating adjacent convolutions of a spring cord, which comprises at least three rotatable wheels mounted in spaced relationship to each other alternately along spaced parallel axes so that the sides of the wheels are parallel and the periphery of at least one wheel on one axis projects into a space defined between two wheels on the other axis, a plurality of rollers mounted in abutting relationship to each other around the circumference of each wheel and freely rotatable about axes substantially tangential to the circumference, means for clamping opposite ends of the spring cord, means for moving said clamping means so as to advance the spring cord transversely of its length between said wheels in surface contact with the peripheries thereof, said wheels co-operating to deform the advancing spring cord into an undulate configuration so as to apply a stretching force thereto at various points along the length thereof, and said rollers permitting longitudinal shifting of the cord, and means for moving said clamping means relatively apart to stretch the spring cord from the ends thereof as it passes between said wheels.

9. Apparatus for separating adjacent convolutions of a succession of spring cords, which comprises a support; an upper shaft mounted on said support in a horizontal position; a plurality of upper wheels of equal size mounted for free rotation at spaced intervals along the length of said upper shaft; a lower shaft mounted on said support in a horizontal position below said upper shaft and in alignment therewith; a plurality of lower wheels of the same sizes as said upper wheels mounted for free rotation at spaced intervals along the length of said lower shaft, said upper wheels being spaced along said upper shaft so as to leave spaces therebetween larger than the widths of said lower wheels plus twice the diameter of the cords, said lower wheels being spaced along said lower shaft so as to align with the spaces between said upper wheels; means for adjusting the distance between said shafts so that the peripheries of said upper and lower wheels overlap each other by a predetermined amount; a plurality of aligned pairs of clamps, each pair being designed for clamping opposite ends of a spring cord; an endless conveyor for mounting said clamps in an endless succession of aligned pairs; and means for driving said conveyor so that the aligned pairs of clamps advance a succession of spring cords transversely of their lengths between said wheels in surface contact with said rollers, said wheels being provided in such number as to cover substantially the entire coiled length of the cord extending between said clamps, said wheels rotating as the cords pass therebetween and co-operating to deform each advancing cord into an undulate configuration to stretch the cord and separate adjacent convolutions thereof from each other and said rollers permitting longitudinal shifting of the cords.

10. Apparatus for separating adjacent convolutions of a succession of spring cords, which comprises a support; an upper shaft mounted on said support in a horizontal position; a plurality of upper wheels of equal size mounted for free rotation at spaced intervals along the length of said upper shaft; a lower shaft mounted on said support in a horizontal position below said upper shaft and in alignment therewith; a plurality of lower wheels of the same sizes as said upper wheels mounted for free rotation at spaced intervals along the length of said lower shaft, said upper wheels being spaced along said upper shaft so as to leave spaces therebetween larger than the widths of said lower wheels plus twice the diameter of the cords, said lower wheels being spaced along said lower shaft so as to align with the spaces between said upper wheels, each wheel having a toric rim of a circular cross section; a plurality of oblate spheroidal rollers mounted in abutting relationship to each other around the circumference of each rim for free rotation about the rim; means for adjusting the distance between said shafts so that the roller peripheries of said upper and lower wheels overlap each other by a predetermined amount; a plurality of aligned pairs of clamps, each pair being designed for clamping opposite ends of a spring cord; an endless conveyor for mounting said clamps in an endless succession of aligned pairs; and means for driving said conveyor so that the aligned pairs of clamps advance a succession of spring cords transversely of their lengths between said wheels in surface contact with said rollers, said conveyor being so constructed and arranged as to cause a gradual movement of each pair of clamps away from each other to stretch the spring cord from the ends thereof as it passes between said wheels, said wheels being provided in such number as to cover substantially the entire stretched length of the cord extending between said clamps, said wheels rotating as the cords pass therebetween and co-operating to deform each advancing cord into an undulate configuration to stretch all portions of the cord as it advances therebetween, and said rollers operating to allow longitudinal shifting of the cords.

References Cited in the file of this patent

UNITED STATES PATENTS

| | | |
|---|---|---|
| 1,830,222 | Brindle | Nov. 3, 1931 |
| 2,163,063 | Romanoff | June 20, 1939 |